United States Patent [19]

Williams, III et al.

[11] Patent Number: 4,909,583

[45] Date of Patent: Mar. 20, 1990

[54] METHOD AND APPARATUS FOR PRESERVING MODES IN FIBER OPTIC CONNECTIONS REQUIRING ANGULAR TRANSLATION

[75] Inventors: John M. Williams, III, Fountain Valley; Robert H. Buckley, Oceanside, both of Calif.

[73] Assignee: Hughes Aircraft Company, Los Angeles, Calif.

[21] Appl. No.: 293,736

[22] Filed: Jan. 5, 1989

[51] Int. Cl.$^4$ .............................................. G02B 6/36
[52] U.S. Cl. .................... 350/96.2; 350/96.15
[58] Field of Search ............... 350/96.15, 96.1, 96.2, 350/96.21, 96.29

[56] References Cited

U.S. PATENT DOCUMENTS

| | | | |
|---|---|---|---|
| 4,277,134 | 7/1981 | Upton, Jr. ........................... | 350/96.2 |
| 4,305,642 | 12/1981 | Bloodworth, Jr. et al. ....... | 350/96.2 |
| 4,389,090 | 6/1983 | LeFevre ............................. | 350/96.29 |
| 4,585,303 | 4/1986 | Pinsard et al. ..................... | 350/96.2 |
| 4,697,874 | 10/1987 | Nozick ............................... | 350/96.23 |
| 4,702,551 | 10/1987 | Coulombe .......................... | 350/96.2 |
| 4,717,231 | 1/1988 | Dewez et al. ...................... | 350/96.2 |
| 4,722,585 | 2/1988 | Boyer ................................. | 350/96.2 |
| 4,730,893 | 3/1988 | Burmeister ........................ | 350/96.22 |
| 4,793,678 | 12/1988 | Matsumoto et al. .............. | 350/96.2 |

FOREIGN PATENT DOCUMENTS

| | | | |
|---|---|---|---|
| 2589589 | 5/1987 | France ............................... | 350/96.2 |
| 60-142317 | 7/1985 | Japan ................................. | 350/96.2 |
| 61-285411 | 12/1986 | Japan ................................. | 350/96.15 |

*Primary Examiner*—William L. Sikes
*Assistant Examiner*—John Ngo
*Attorney, Agent, or Firm*—Joseph E. Szabo; Terje Gudmestad; Wanda K. Denson-Low

[57] ABSTRACT

A mode preserving apparatus (11) comprising a supporting structure (13), an optical fiber (15), a pin connector (17) for positioning a first region of the optical fiber at a first location and a strain-relief mechanism (19) for positioning a second region of the fiber at a second location. A bobbin assembly (21), includng a first bobbin (23), is mounted on the supporting structure (13) for movement relative to the first and second locations. The optical fiber (15) extends along a path from the first location at least part way around the bobbin (23) to the second location so that movement of the bobbin (23) relative to the first and second locations alters the configuration of the path.

22 Claims, 5 Drawing Sheets

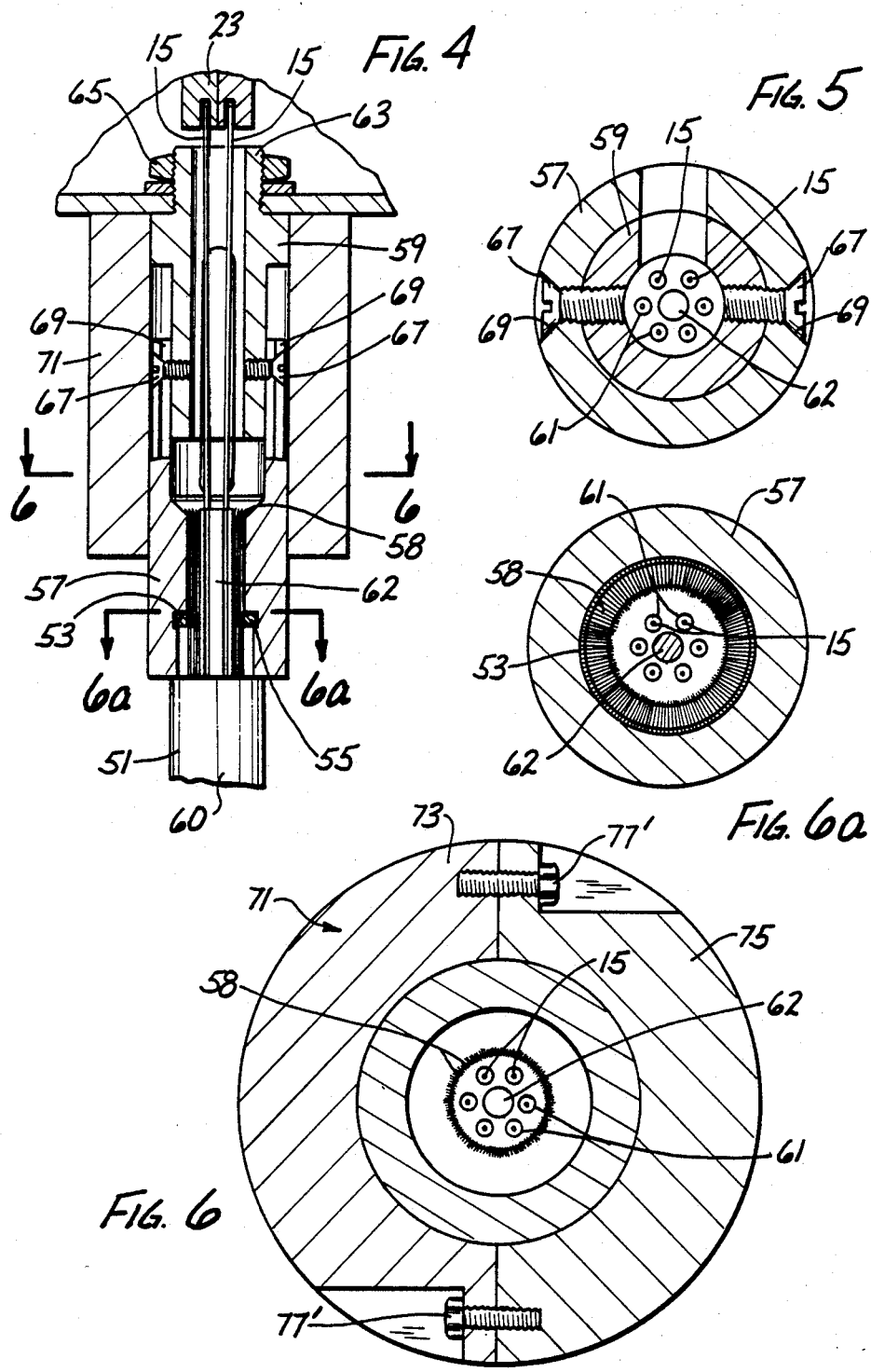

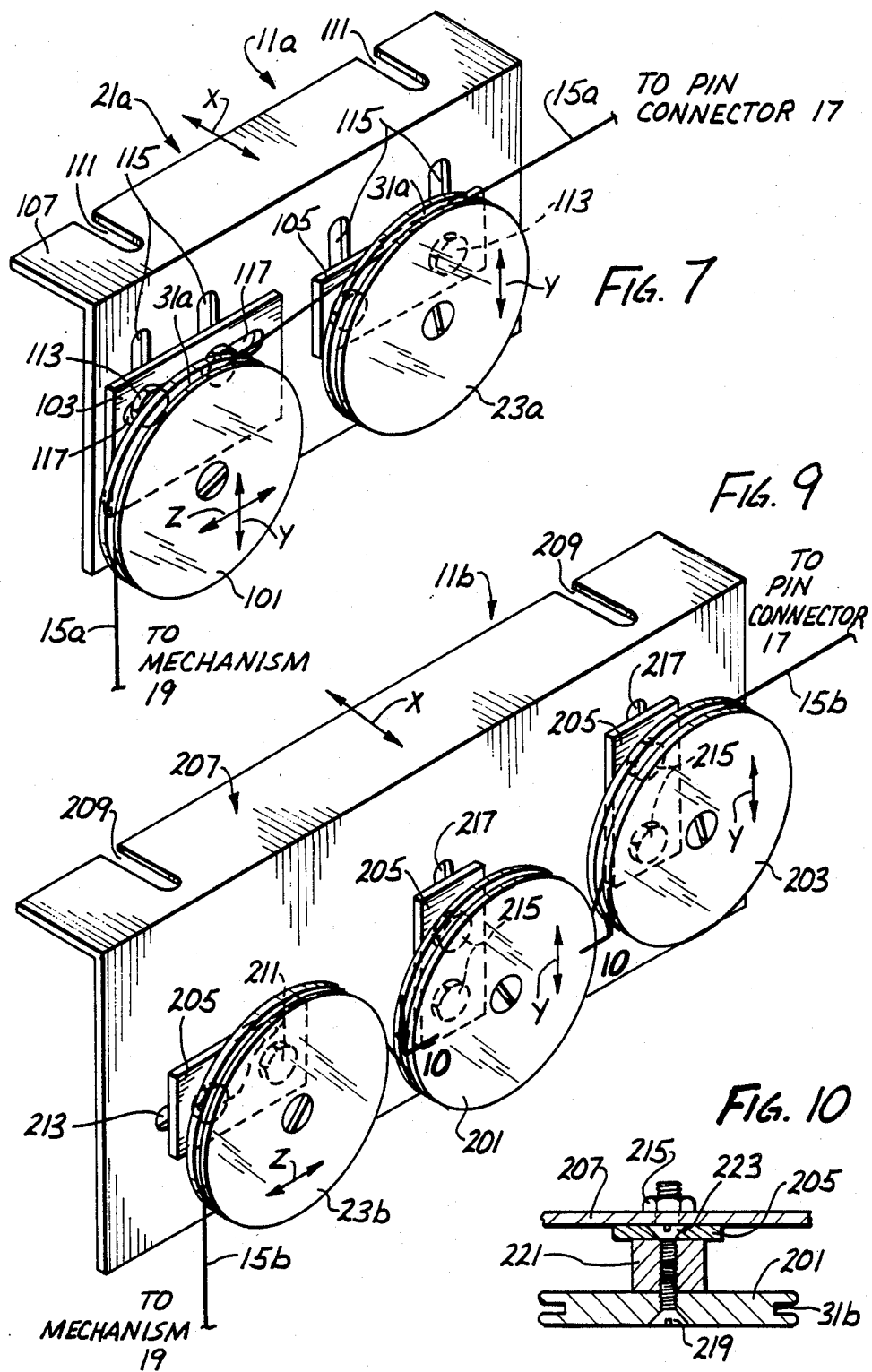

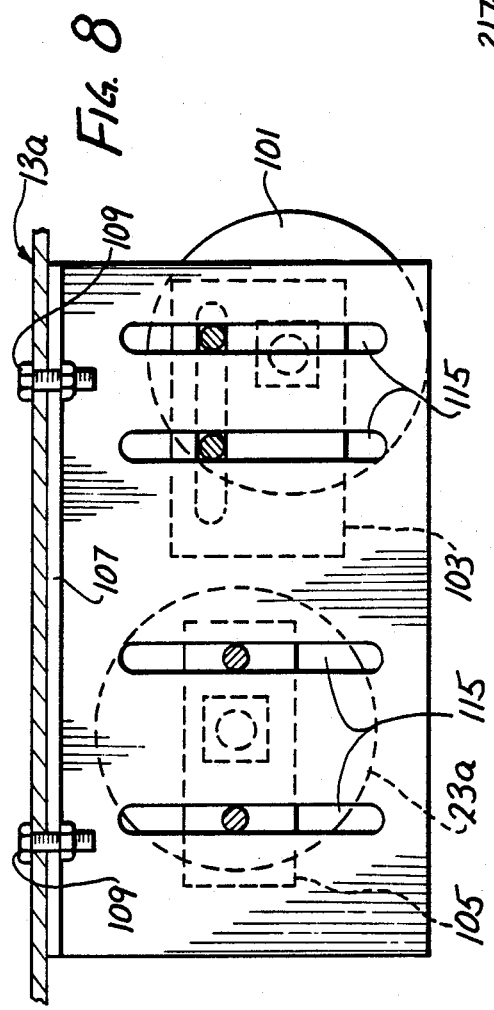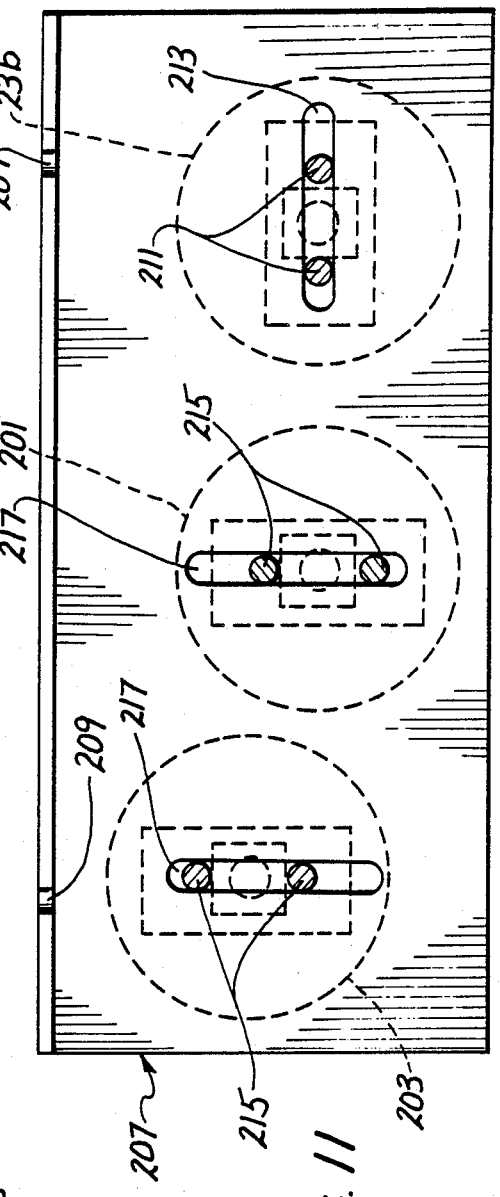

METHOD AND APPARATUS FOR PRESERVING MODES IN FIBER OPTIC CONNECTIONS REQUIRING ANGULAR TRANSLATION

BACKGROUND OF THE INVENTION

1. Field of the Invention

This invention relates to an apparatus which preserves modal purity in fiber optic connections where curving of the optical fiber is necessary.

2. Description of Related Art

As is well known, certain optical fibers are capable of transmitting light within mode groups. In some specialized applications, it is important to maintain the modal patterns of the light transmitted through an optical fiber over the entire length of the fiber. In these applications, system performance depends on how well the fiber optic system can contain the transmitted light within well-defined mode groups. Specifically, light injected into the fiber near the numerical aperture, i.e., high-order modes, must be well separated from light injected along the central axis of the optical fiber, i.e., low-order modes. A measure of how well the fiber optic system maintains this separation of modes is referred to as modal purity.

Specialized optical fibers and cables that maintain high levels of modal purity throughout their length are known. However, problems have been encountered in maintaining modal purity in certain regions of the fiber optic system.

More specifically in certain systems, the fiber optic cable is terminated in a strain relief mechanism, and the optical fibers continue beyond the strain relief mechanism to pin connectors. The bending of the optical fibers between the strain relief mechanism and the pin connectors produces tighter bends at the fixed points of termination, i.e., at the strain relief mechanism and the pin connectors. These tighter bends induce stresses within the optical fibers which degrade modal purity and cause micro-bending in the optical fibers which produce optical power losses in the high-order mode groups.

SUMMARY OF THE INVENTION

This invention provides a mode-preserving apparatus which reduces the degradation of modal purity between the fiber optic cable termination at the strain relief and the pin connectors. More generally, the mode-preserving apparatus of this invention can be used to preserve modal purity in many different environments by appropriately controlling the configuration of the path along which an optical fiber extends. Accordingly, although the mode-preserving apparatus of this invention is particularly adapted for use between a strain-relief mechanism and a pin connector, its use is not so limited, and it can be used in many different environments to achieve the general purpose of preserving modal purity by appropriately configuring the path along which the optical fiber extends A mode-preserving apparatus constructed in accordance with this invention may include a supporting structure, an optical fiber, means on the supporting structure for positioning a first region of the optical fiber at a first location and means on the supporting structure for positioning a second region of the optical fiber at a second location. The optical fiber extends along a path from the first location to the second location.

To control the configuration of such path, this invention includes a bobbin assembly which includes a first bobbin. The bobbin is mounted on the supporting structure for movement relative to the first and second locations. The optical fiber extends at least part way around the first bobbin so that movement of the bobbin relative to the first and second locations alters, and thereby tends to control, the configuration of the path.

It is desirable for the bobbin to have a curved, preferably generally cylindrical, peripheral surface with the radius of the peripheral surface being greater than the critical bend radius of the optical fiber. When an optical fiber is bent or curved, its modal purity degrades, and the critical bend radius is the radius at or above which there is an acceptable degradation of modal purity.

To provide a greater length of optical fiber accommodate thermal expansion of the fiber within the cable, the fiber can be wrapped completely around the bobbin. Preferably, the bobbin is non-rotatably mounted on the supporting structure. If the bobbin could rotate, bobbin rotation might unfavorably tension the fiber to degrade modal purity.

One purpose of the relative movement between the bobbin and the supporting structure is to bring about the desired configuration of the path along which the optical fiber extends. Ordinarily, the path will be configured to provide maximum modal purity, although known "built-in" losses can be provided, if desired. Depending upon the results desired and the construction employed, the relative movement may be along two or three orthogonal axes and may or may not include pivotal movement. For example, if only one bobbin is employed, it is preferably movable along three orthogonal axes.

In a preferred construction, first and second linear lengths of the optical fiber are provided, with such linear lengths extending along lines which substantially intersect to define a plane. Preferably, the bobbin is movable relative to the supporting structure so that it can be located in such plane, and the location of the bobbin in the plane can be adjusted. In a preferred arrangement, such lines are substantially tangent to the peripheral surface of the bobbin.

To accurately control the configuration of the fiber and hence the modal purity, it is desirable to slightly tension the optical fiber. This can be accomplished, for example, by one of the positioning means and/or by an additional bobbin, with the bobbin being mounted on the supporting structure for movement in a direction that would tension the optical fiber. For example, in a two-bobbin embodiment, the first bobbin is preferably mounted for movement about first and second orthogonal axes, and the second bobbin is mounted for movement about second and third orthogonal axes, and both of the bobbins are preferably pivotable together as a unit to assure that they are placed in the desired plane. The two-bobbin embodiment can be advantageously employed for applications where there is insufficient room for the optical fiber positioning means to include the tensioning mechanism.

As indicated above, this invention contemplates the use of one or more bobbins, and this can be further illustrated by a three-bobbin embodiment in which the first and second bobbins are movable along first and second and first and third axes, respectively to provide the desired alignment with the associated regions of the optical fiber. The third bobbin is mounted on the supporting structure for movement in a direction to tension the optical fiber. This embodiment can be used, for example, when certain physical constraints are present and/or when there is a very large amount of slack in the optical fiber that must be taken up.

The nature and construction of the means on the supporting structure for positioning the first and second regions of the optical fiber will vary depending upon the environment in which the invention is used. For example, the first region of the optical fiber may be positioned by a strain-relief mechanism, and the second region of the optical fiber may be positioned by a pin connector.

According to the method of this invention, the optical fiber is wrapped at least part way around the bobbin, and the position of the bobbin is adjusted to preserve the modal purity to the desired degree. To provide for the greatest preservation of modal purity, the bobbin is moved to place the optical fiber into the plane defined by the linear lengths of the optical fiber referred to above.

The invention, together with additional features and advantages thereof, may best be understood by reference to the following description taken in connection with the accompanying illustrative drawing

BRIEF DESCRIPTION OF THE DRAWING

In the accompanying drawings:

FIG. 4 is a fragmentary, sectional view similar to a portion of FIG. 3, with a housing mounted on the tensioning mechanism.

FIG. 5 is an enlarged sectional view taken generally along line 5—5 of FIG. 3.

FIGS. 6 and 6a are enlarged sectional views taken generally along lines 6—6 and 6a—6a of FIG. 4.

FIG. 7 is an isometric view of a two-bobbin embodiment of this invention.

FIG. 8 is a rear elevational view of the two-bobbin embodiment mounted on the supporting structure.

FIG. 9 is an isometric view of a three-bobbin embodiment of this invention.

FIG. 10 is a sectional view taken generally along line 10—10 of FIG. 9.

FIG. 11 is a rear elevational view of the three-bobbin embodiment.

DESCRIPTION OF THE PREFERRED EMBODIMENT

Figures 1, 2:
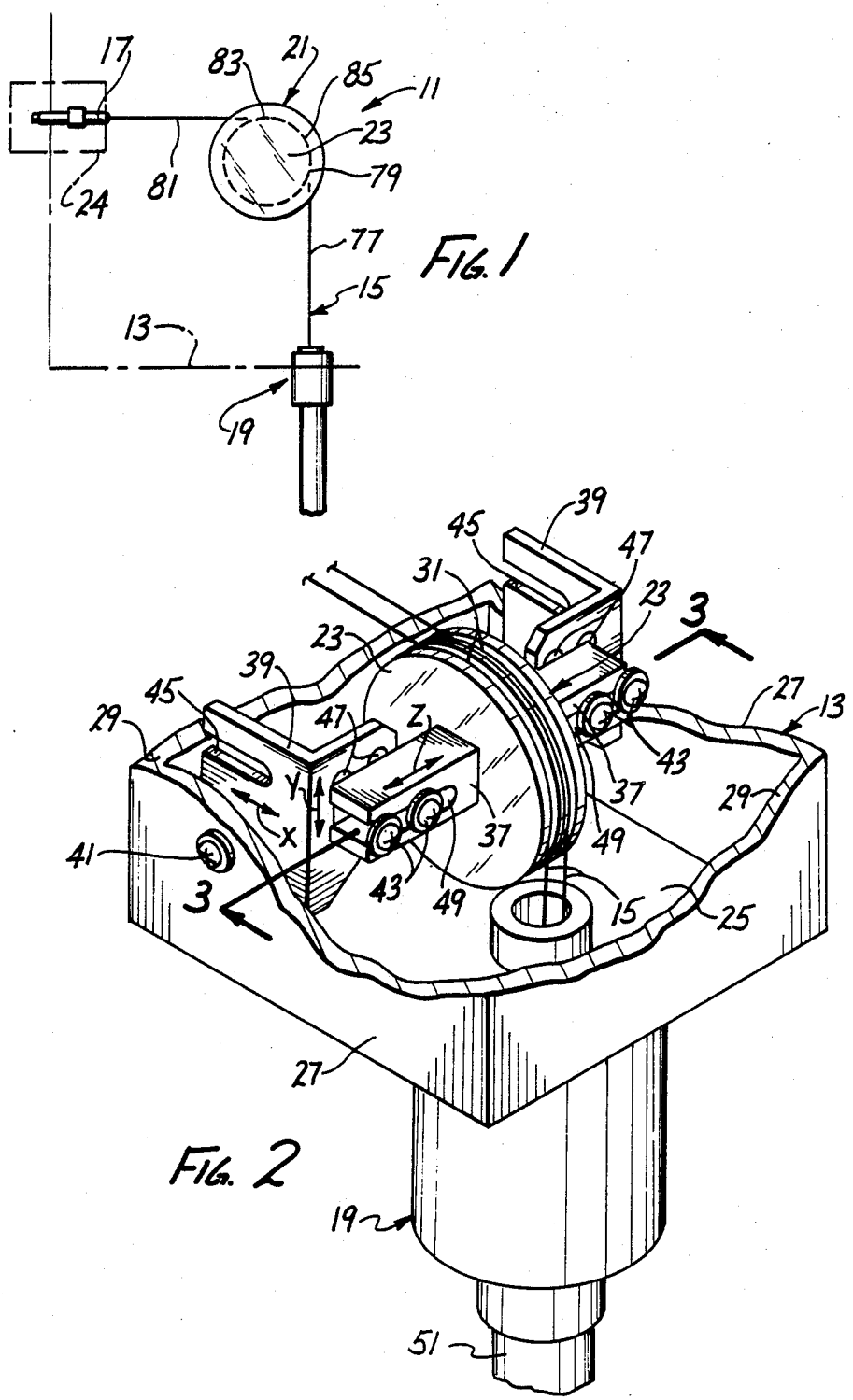
FIG. 1 is a schematic illustration of one form of mode-preserving apparatus constructed in accordance with the teachings of this invention.
FIG. 2 is a isometric view of the mode-preserving apparatus, with a portion of the supporting structure broken away.

Referring now to the drawings in more detail, FIG. shows a mode preserving apparatus 11 which generally includes a supporting structure 13, an optical fiber 15, first means on the supporting structure in the form of a pin connector 17 for positioning a first region of the optical fiber at a first location, second means on the supporting structure in the form of a strain relief and tensioning mechanism 19 for positioning a second region of the optical fiber at a second location, and a bobbin assembly 21 including a bobbin 23. In this embodiment, the bobbin assembly 21 is mounted on the supporting structure 13 for movement relative to the supporting structure along three orthogonal axes.

The pin connector 17 is coupled to a connector housing 24 in a conventional manner and serves to position a linear length of the optical fiber 15 at a desired location. Such linear length is represented in FIG. 1 by the length of the pin connector 17. Similarly, the mechanism 19 positions a second linear length of the optical fiber 15 as shown, for example in FIG. 3. These linear lengths extend along lines which substantially intersect to define a plane, and the adjustability of the bobbin 23 along the three orthogonal axes enables the bobbin 23 to be positioned in this plane.

FIGS. 2-6a show a preferred form of the apparatus for positioning two fibers. Although various constructions are possible, in the illustrated embodiment, the supporting structure 13 is in the form of a housing having a lower wall 25, top wall 26 (FIG. 3) and opposite side walls 27 and 29.

Figure 3:
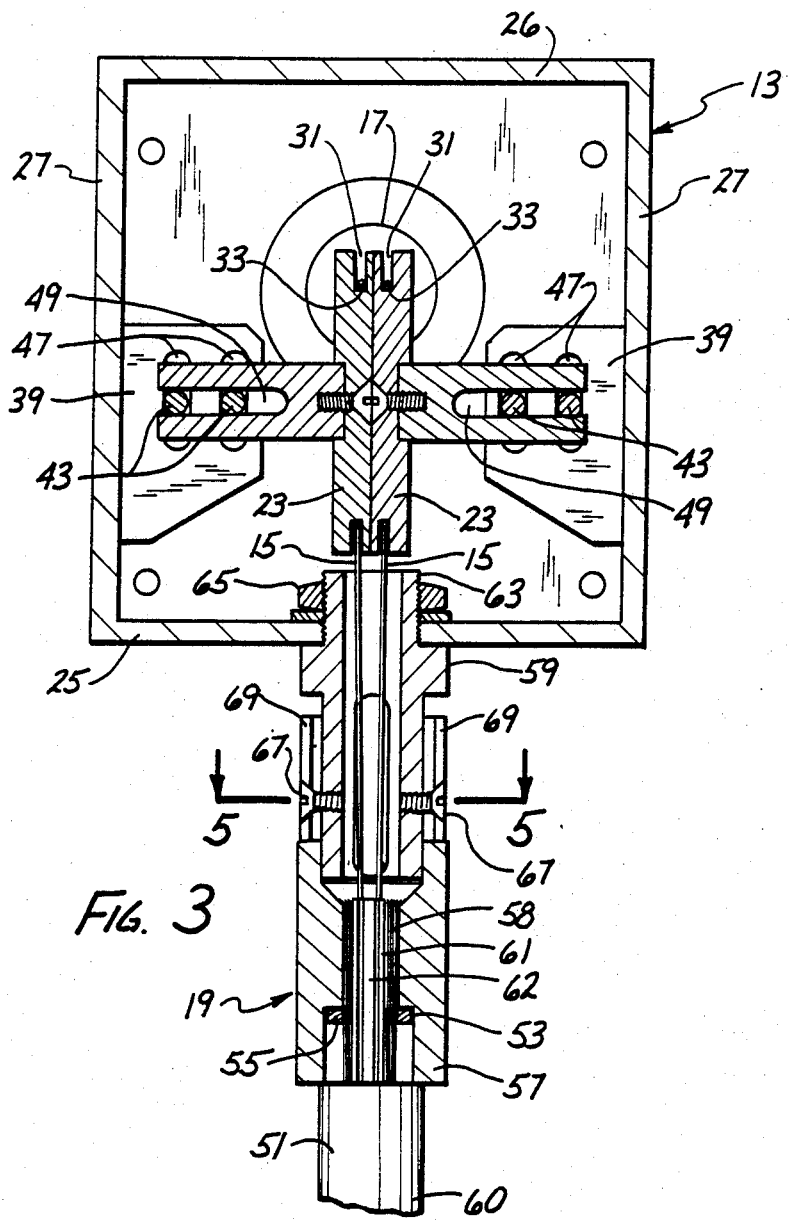
FIG. 3 is a sectional view taken generally along line 3—3 of FIG. 2.

As shown in FIGS. 2 and 3, two of the bobbins 23 are employed. Although the bobbins 23 can have any desired contour, in this embodiment, the bobbins 23 are cylindrical and have annular grooves 31, each having a cylindrical, peripheral surface 33. Alternately, where the lengths of the fibers 15 can be tightly controlled, the bobbins 23 can be replaced with a single bobbin with multiple grooves. The number of grooves 31 and pin connectors 17 (FIG. 1) corresponds to the number of fibers 15. I the form shown in FIGS. 2-6a, two of the fibers 15 and, therefore, two of the bobbins 23, two of the grooves 31 and two of the pin connectors are provided, although only one of the pin connectors is shown in FIG. 1. Of course, any number of fibers 15 can be accommodated by a single bobbin 23 if the fiber lengths are tightly controlled. The radii of the peripheral surfaces 33 are greater than the critical bend radius of the associated optical fiber 15, and in this embodiment, these radii are equal.

The bobbin assembly 21 includes means for non-rotatably mounting the bobbins 23 for movement relative to the supporting structure 13 along three orthogonal axes. Although such means may take various different forms, in this embodiment, it includes blocks 37 suitably coupled to the opposite faces of the bobbins 23 and brackets 39 joined to the side walls 27 and the blocks 37 by screws 41 and 43, respectively. Slots 45 in the brackets 39, slots 47 in the brackets 39 and slots 49 in the blocks 37 cooperate with the screws 41 and 43 to provide for movement of the bobbins 23 along mutually perpendicular X,Y and Z axes, respectively, relative to the supporting structure 13. If desired, the screws 41 and 43 may fit somewhat loosely in the associated slots 45, 47 and 49 to allow slight pivoting or tilting movement of the bobbins 23 in order to obtain very accurate positioning of the bobbins as may be desired.

A fiber optic cable 51 comprising, among other things, the two optical fibers 15, leads to the mechanism 19. The cable 51 is conventional.

The mechanism 19 incorporates a conventional strain relief feature which includes a strain relief ring 53 (FIGS. 3, 4 and 6a) seated in an annular groove 55 of an outer tube 57. The conventional fiber optic cable 51 also includes a sheath 60 loosely containing packing 58 of Kevlar, tubes 61 (FIGS. 3-6a) and a core 62. Only two of the tubes 61 contain optical fibers 15. The packing 58 is wrapped around the ring 53 as shown in FIGS. 3 and 6a to provide strain relief in a conventional manner. The packing 58, tubes 61 and core 62 terminate as shown in FIGS. 3 and 4, and the fibers 15 extend out of their respective tubes 61 through an inner tube 59 to the bobbin 23.

The inner tube 59 has a screw portion 63 which extends through an opening in the bottom wall 25, and a nut 65 (FIGS. 3 and 4) is threaded onto the screw portion 63 to firmly mount the inner tube 59 on the bottom wall 25. The outer tube 57 telescopes over a lower portion of the inner tube 59 and can be clamped at any desired axial position along the inner tube 59 by screws 67 which extend through axially extending slots 69, respectively, of the outer tube 57. Consequently, assuming that the pin connectors 17 tightly retain the optical fibers 15, the fibers can be tensioned by moving the outer tube 57 downwardly to the position of FIG. 4 and then tightening the screws 67 to lock the outer tube in this position.

If desired, following the tensioning of the fibers 15, an outer housing 71 (FIGS. 4 and 6) can be provided around the tubes 57 and 59 for protection and to guard against loosening of the screws 67. Although the housing 71 could be of various different constructions and may simply comprise shrink tubing, in this embodiment, it includes two semi-cylindrical housing sections 73 and 75 interconnected by screws 77 and clamped onto the tubes 57 and 59.

The pin connector 17 may be of conventional construction and may, for example, be of the type shown in Maranto et al U.S. patent application Ser. No. 229,378 filed on Aug. 5, 1988.

The adjustability features of the apparatus 11 are primarily adapted for use at the factory prior to shipment of the apparatus 11, although they can be used in the field, if desired. In any event, assuming that the fibers are extending into the supporting structure 13 as shown in FIG. 3, they are wrapped at least one turn completely around the associated bobbin 23, with each of the fibers being in the associated groove 31. The grooves 31 are preferably generally U-shaped, rather than V-shaped in order to avoid compressing the fiber in the bottom of the groove. Assuming that the remote ends of the fibers 15 have been suitably attached to associated pin connectors 17, then the connectors are appropriately attached to the connector housing 24 as shown in FIG. 1.

Next, the positions of the bobbins 23 are adjusted along the X, Y and Z axes to the desired position. Typically, in the desired position, the bobbins 23 and the annular grooves 31 lie substantially in the plane defined by the lines along which the above-mentioned linear lengths of the associated optical fiber 15 extends. A first length 77 (FIG. 1) of one of the fibers 15 between the mechanism 19 and a point of tangency 79 of this length on the associated bobbin 23 forms a linear extension of the linear length of that same fiber provided by the mechanism 19. Similarly, a length 81 (FIG. 1) of that same fiber 15 between the associated pin connector 17 and its point of tangency 83 with the associated bobbin 23 also forms a linear extension of the linear length of that same fiber 15 within the pin connector 17. Thus, the point of tangency 79 is aligned with the linear length of the associated fiber 15 in the mechanism 19, and similarly, the point of tangency 83 is aligned with the linear length 81 of the associated fiber 15 in the associated pin connector 17. When so arranged, the fiber 15 does not bend as it leaves the mechanism 19 or as it enters the pin connector 17, and the lengths 77 and 81 lie in the same plane, are perpendicular and are joined by a gently curved length 85 of the fiber 15 which is formed by the peripheral surface 33. Because there are two of the fibers 15, these relationships exist for both of the fibers 15, and the bobbins 23 lie in the planes defined by both of the fibers.

FIGS. 7 and 8 show an apparatus 11a which is identical to the apparatus 11 in all respects not shown or described herein. Portions of the apparatus 11a corresponding to portions of the apparatus 11 are designated by corresponding reference numerals followed by the letter "a."

The primary differences between the apparatus 11 and 11a are that the apparatus 11a has a second bobbin 101, which is used to both position and tension the fiber 15a. Accordingly, the tensioning mechanism shown in FIGS. 3 and 4 can be eliminated in favor of the bobbin 101. For simplicity of illustration, only one groove 31a is shown in each of the bobbins 23a and 101.

Although various different constructions can be employed, in the form shown in FIGS. 7 and 8, the bobbins 23a and 101 are mounted on plates 105 and 103, respectively, and these plates are in turn mounted on a single bracket 107. The bracket 107 is mounted on the upper wall of the supporting structure 13a by threaded fasteners 109 which project through slots 111 (FIG. 7) to thereby provide adjustment along the "X" axis. The fiber 15a is preferably wrapped completely around both bobbins.

The plates 103 and 105 are attached to the bracket 107 by screws 113, which extend through slots 115 to provide "y"-axis adjustment. In addition, the plate lot has slots 117 which cooperate with the screws 113 to provide "Z"-axis adjustment for the bobbin 101. Thus, with this construction, the bobbin 101 can be adjusted along three mutually perpendicular axes, and the bobbin 23a is adjustable with the bobbin 101 along the "X" axis and is independently adjustable along the "Y" axis. To tension the fiber 15a, a bobbin 101 is adjusted along the "Y" axis. In addition, the bracket 107 can be pivoted or tilted slightly in the slots 111 to accurately place both the bobbins 23a and 101 in the desired plane.

The bobbins 23a and 101 are suitably non-rotatably mounted on the plates 105 and 103, respectively. The optical fiber 15a is preferably wrapped one complete time about the bobbin 101 in the same manner as described above for the bobbin 23.

In use, the bobbin 23a is first adjusted along the "X" and "Y" axes so that the length of fiber 81 (FIG. 1) extends from the pin connector in a linear fashion without any bend where the fiber 15a enters the pin connector. Next, the bobbin 101 is similarly aligned with the mechanism 19 by moving the bobbin 101 along the "X" and "Z" axes so that the length of fiber 77 extends in straight-line fashion from the mechanism 19 without any bends where the fiber 15a enters the pin connector. Finally, the bobbin 101 is moved independently along the "Y" axis as permitted by the slots 115 to tension the fiber 15a.

FIGS. 9–11 show an apparatus 11b which is identical to the apparatus 11 in all respects not shown or described herein. Portions of the apparatus 11b corresponding to portions of the apparatus 11 are designated by corresponding reference numerals followed by the letter "b."

The primary differences between the apparati 11 and 11b are that the apparatus 11b has two additional bobbins 201 and 203, and the bobbin 201 tensions the optical fiber 15b so that the tensioning mechanism portion of the mechanism 19 can be eliminated. The bobbins 23b, 201 and 203 are each fixedly mounted on a plate 205, and the plates 205 are in turn mounted on a bracket 207. The bracket 207 has slots 209 and can be mounted on the top wall of the supporting structure in the same manner as described above in connection with the apparatus 11a to provide adjustment along the "X" axis. Screws 211 cooperate with slots 213 to mount the bobbin 23b for movement along the "Z" axis, and screws 215 cooperate with slots 217 to mount the bobbins 201 and 203 for "Y" axis movement.

The bobbins shown in FIGS. 7 and 9 can be fixedly mounted on the associated plates in any suitable manner. FIG. 10 shows by way of example a preferred technique for fixedly attaching the bobbin 201 to the plate 205. The other bobbins of FIGS. 7 and 9 can be similarly attached to the associated plate.

As shown in FIG. 10, the bobbin 201 is fixedly mounted by a screw 219 to a spacer block 221 which is in turn fixedly attached to the plate 205 by a screw 223. The plate 205 is in turn fixedly mounted on the bracket by the screws 215. FIG. 10 also shows the annular groove 31b for the single fiber 15b. Of course, as with all embodiments of this invention, the bobbins can accommodate any desired number of the optical fibers.

The optical fiber 15b is preferably wrapped completely around the bobbins 23b and 203. However, the fiber is not completely wrapped around the bobbin 201.

In use, the bobbin 203 is positioned along the "X" and "Y" axes so that the length of fiber 77 (FIG. 1) extends from the pin connector 17 in linear fashion without any bend where the fiber enters the connector. Next, the bobbin 23b is similarly aligned with the mechanism 19 by moving the bobbin 23b along the "X" and "Z" axes so that the length of fiber 77 extends in straight-line fashion from the mechanism 19 without any bends where the fiber 15b enters the mechanism. Finally, the bobbin 201 is moved along the Y-axis to tension the fiber 15b.

Although exemplary embodiments of the invention have been shown and described, many changes, modifications and substitutions may be made by one having ordinary skill in the art without necessarily departing from the spirit and scope of this invention.

What is claimed is:

1. A mode preserving apparatus comprising:
a supporting structure;
an optical fiber;
first means on the supporting structure for positioning a first region of the optical fiber at a first location;
second means on the supporting structure for positioning a second region of the optical fiber at a second location;
a bobbin assembly including a first bobbin and means for mounting the first bobbin on the supporting structure for movement relative to the first and second locations along at least two orthogonal axes; and
the optical fiber extending along a path from said first location at least part way around the first bobbin to the second location whereby movement of the first bobbin relative to the first and second locations alters the configuration of said path.

2. A mode preserving apparatus comprising:
a supporting structure;
an optical fiber;
first means on the supporting structure for positioning a first region of the optical fiber at a first location;
second means on the supporting structure for positioning a second region of the optical fiber at a second location;
a bobbin assembly including a first bobbin and means for mounting the first bobbin on the supporting structure for movement relative to the first and second locations along at least three orthogonal axes; and
the optical fiber extending along a path from said first location at least part way around the first bobbin to the second location whereby movement of the first bobbin relative to the first and second locations alters the configuration of said path.

3. A mode preserving apparatus comprising:
a supporting structure;
an optical fiber;
first means on the supporting structure for positioning a first region of the optical fiber at a first location;
second means on the supporting structure for positioning a second region of the optical fiber at a second location;
a bobbin assembly including a first bobbin and means for mounting the first bobbin on the supporting structure for pivotal movement relative to the first and second locations along at least two orthogonal axes; and
the optical fiber extending along a path from said first location at least part way around the first bobbin to the second location whereby movement of the first bobbin relative to the first and second locations alters the configuration of said path.

4. A mode preserving apparatus comprising:
a supporting structure;
an optical fiber;
first means on the supporting structure for positioning a first region of the optical fiber at a first location;
second means on the supporting structure for positioning a second region of the optical fiber at a second location;
means for tensioning the optical fiber between the first and second locations;
a bobbin assembly including a first bobbin and means for mounting the first bobbin on the supporting structure for movement relative to the first and second locations; and
the optical fiber extending along a path from said first location at least part way around the first bobbin to the second location whereby movement of the first bobbin relative to the first and second locations alters the configuration of the said path.

5. An apparatus as defined in claim 4 wherein the first means includes the tensioning means.

6. A mode preserving apparatus comprising:
(a) a supporting structure;
(b) an optical fiber;
(c) first means on the supporting structure for positioning a first region of the optical fiber at a first location;
(d) second means on the supporting structure for positioning a second region of the optical fiber at a second location;
(e) a bobbin assembly including (i) a first bobbin and means for mounting the first bobbin on the supporting structure for movement relative to the first and second locations, (ii) a second bobbin, the optical fiber extending at least part way around the second bobbin, and (iii) means for mounting the second bobbin on the supporting structure for movement relative to the supporting structure in a direction to tension the optical fiber; and (f) the optical fiber extending along a path from said first location at least part way around the first bobbin to the second location whereby movement of the first bobbin relative to the first and second locations alters the configuration of said path.

7. A mode preserving apparatus comprising:

(a) a supporting structure;

(b) an optical fiber;

(c) first means on the supporting structure for positioning a first region of the optical fiber at a first location;

(d) second means on the supporting structure for positioning a second region of the optical fiber at a second location;

(e) a bobbin assembly including (i) a first bobbin and means for mounting the first bobbin on the supporting structure for movement relative to the first and second locations along at least two orthogonal axes, (ii) a second bobbin, the optical fiber extending at least part way around the second bobbin, and (iii) means for mounting the second bobbin on the supporting structure for movement relative to the supporting structure; and (f) the optical fiber extending along a path from said first location at least part way around the first bobbin to the second location whereby movement of the first bobbin relative to the first and second locations alters the configuration of the said path.

8. An apparatus as defined in claim 7 wherein the bobbin assembly includes a third bobbin engaging the optical fiber and means for mounting the third bobbin on the supporting structure for movement in a direction to tension the optical fiber.

9. A mode preserving apparatus comprising:

a supporting structure;

an optical fiber capable of transmitting multiple mode groups;

first means on the supporting structure for positioning a first linear length of the optical fiber at a first location;

second means on the supporting structure for positioning a second linear length of the optical fiber at a second location;

said linear lengths extending along lines which substantially intersect to define a plane;

a bobbin assembly including a first bobbin and means for mounting the first bobbin on the supporting structure for movement so that the first bobbin can be in said plane and the location of the bobbin in said plane can be adjusted;

the optical fiber extending along a path from said first linear length at least part way around the first bobbin to the second linear length whereby said movement of the first bobbin can place the path in said plane; and means for tensioning the optical fiber.

10. An apparatus as defined in claim 9 wherein the first bobbin has a curved peripheral surface and the optical fiber is wrapped around the peripheral surface at least one time.

11. An apparatus as defined in claim 9 wherein the first bobbin has a generally cylindrical peripheral surface with a radius greater than the critical bend radius of the optical fiber.

12. An apparatus as defined in claim 9 wherein the bobbin mounting means nonrotatably mounts the bobbin on the supporting structure.

13. An apparatus as defined in claim 9 wherein the bobbin mounting means mounts the first bobbin so that said lines are substantially tangent to the cylindrical surface.

14. An apparatus as defined in claim 9 wherein the bobbin assembly includes a second bobbin engaging the optical fiber and means for mounting the second bobbin for movement relative to the supporting structure.

15. An apparatus as defined in claim 9 wherein said means for mounting includes a bracket, means for mounting the bracket on the supporting structure for movement relative to the supporting structure and means for mounting the first bobbin on the bracket for movement relative to the bracket.

16. An apparatus as defined in claim 15 wherein the bobbin assembly includes a second bobbin engaging the optical fiber and means for mounting the second bobbin on the bracket for movement relative to the bracket 17. An apparatus as defined in claim 16 wherein the bobbin assembly includes a third bobbin engaging the optical fiber and means for mounting the third bobbin on the bracket for movement relative to the bracket, said second and third bobbins being mounted for generally parallel movement relative to said bracket.

18. A mode preserving apparatus comprising:

a supporting structure;

an optical fiber capable of transmitting multiple mode groups;

first means on the supporting structure for positioning a first linear length of the optical fiber at a first location;

second means on the supporting structure for positioning a second linear length of the optical fiber at a second location;

a bobbin assembly including first and second bobbins;

said optical fiber extending from said first length to a first point of tangency on the first bobbin, at least part way around the first and second bobbins and through a second point of tangency at the second bobbin to said second length;

said bobbin assembly including means for mounting the first and second bobbins for movement so that the first and second points of tangency can be aligned with the first and second linear lengths, respectively; and means for tensioning the optical fiber.

19. An apparatus as defined in claim 18 wherein the bobbin assembly includes a third bobbin engaging the optical fiber and means for mounting the third bobbin on the supporting structure for movement in a direction to tension the optical fiber.

20. A method of preserving modal purity in light traveling along an optical fiber from a first location to a second location wherein the optical fiber must change direction in extending from the first location to the second location, said method comprising:

wrapping the optical fiber at least part way around a bobbin; and adjusting the position of the bobbin and of the optical fiber therein so as to reduce stresses on the optical fiber sufficiently to preserve the modal purity of said light.

21. A method as defined in claim 20 including tensioning the optical fiber.

22. A method as defined in claim 20 wherein there are first and second linear lengths of the optical fiber extending to the first and second locations, respectively, with said linear lengths extending along lines which substantially intersect to define a plane and said step of adjusting includes moving the bobbin to place the optical fiber between said locations substantially into said plane.

* * * * *